Patented Jan. 21, 1930

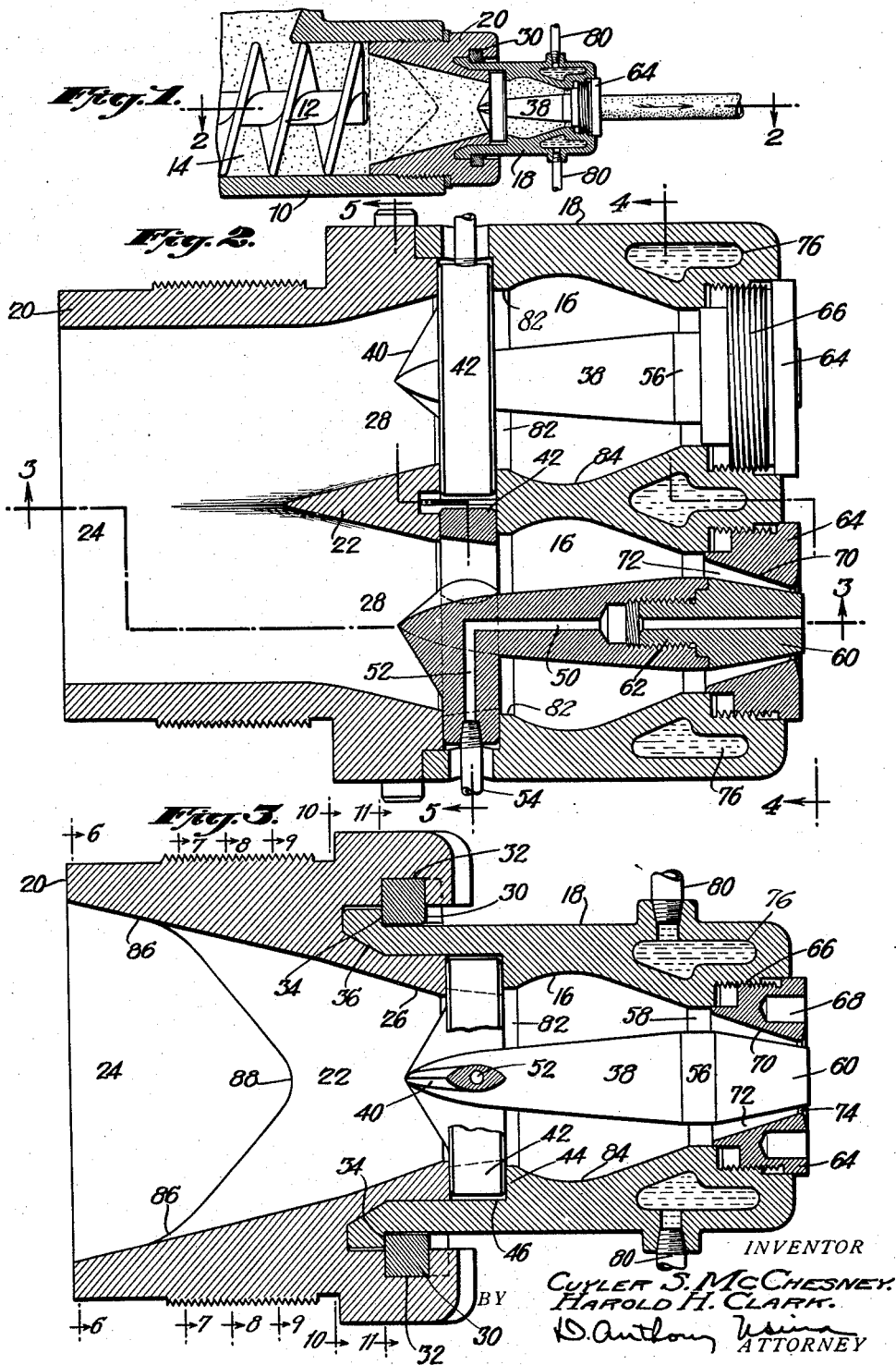

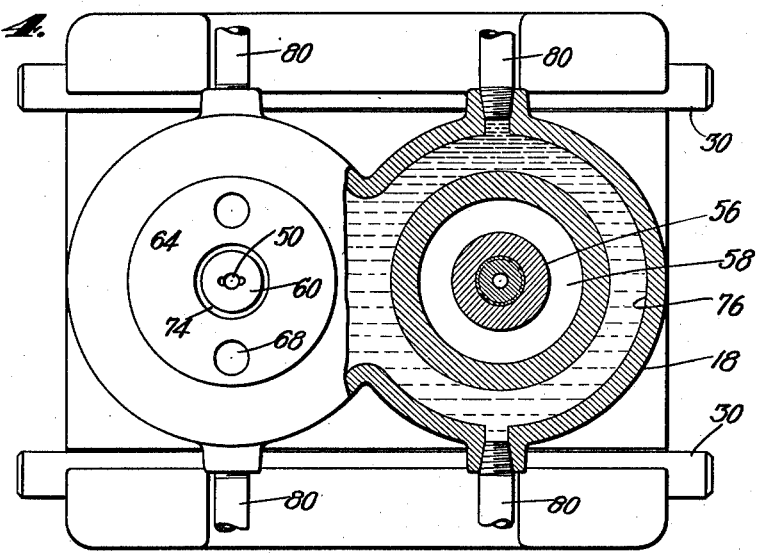
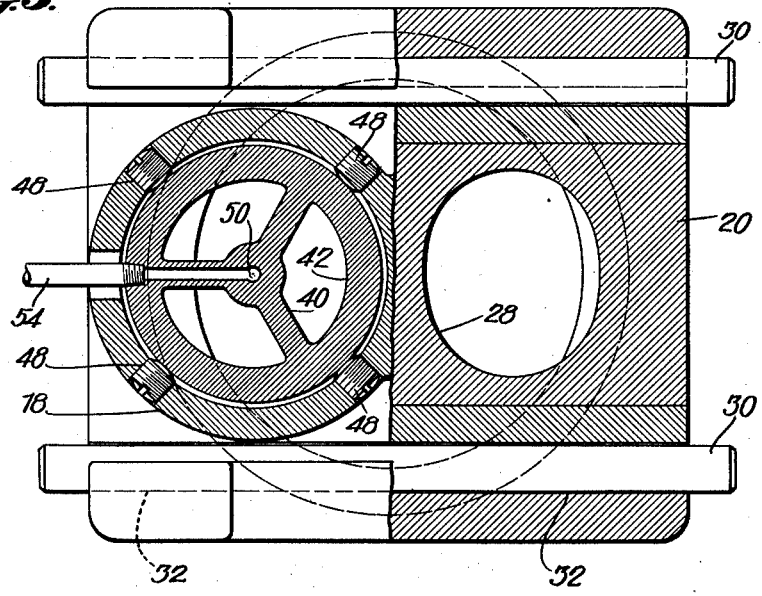

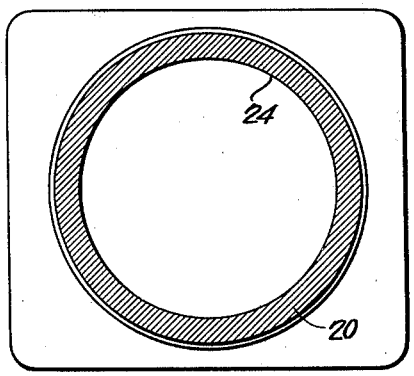
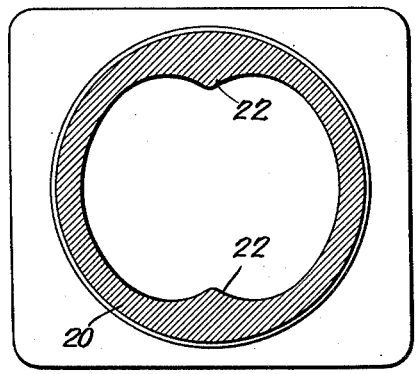
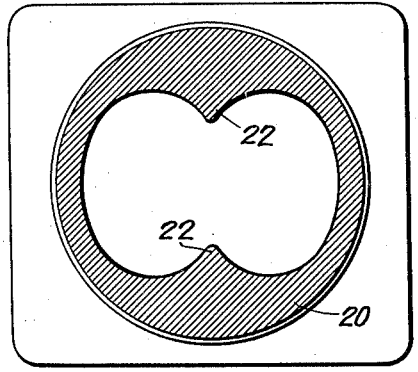
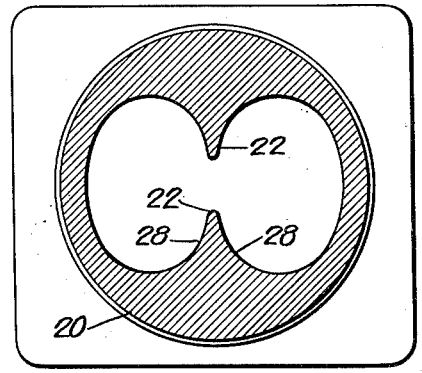
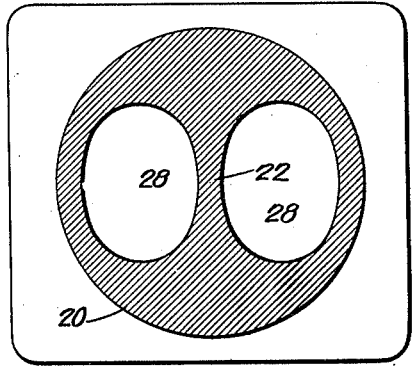
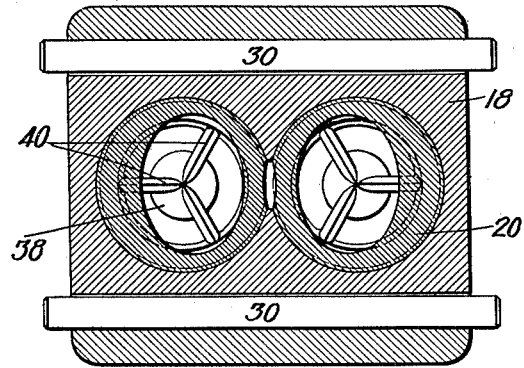

1,744,130

UNITED STATES PATENT OFFICE

CUYLER S. McCHESNEY, OF KENMORE, AND HAROLD H. CLARK, OF BUFFALO, NEW YORK, ASSIGNORS TO DUNLOP TIRE AND RUBBER CORPORATION, OF BUFFALO, NEW YORK, A CORPORATION OF NEW YORK

APPARATUS FOR EXTRUDING TUBES

Application filed March 19, 1928. Serial No. 262,627.

This invention relates to apparatus for making tubes from a plastic mass such as rubber or equivalent gums. While not limited thereto the embodiment of the invention illustrated is intended for use in the manufacture of the so-called inner tubes used in automobile tires. Heretofore it has been the practice to extrude plastic rubber through a chambered member known in the art as a die-box having a longitudinally extending core or mandrel which serves to form the central void in the tube. Necessarily such mandrel must be supported by arms extending radially from the center to the outer part thereof. Hence it is clear that in extruding the mass or rubber the same is divided into different masses by the radial mandrel supporting arms. After the mass of rubber passes the mandrel supporting arms it is the intent of prior apparatus that the mass of rubber shall again become bonded together into one body but in practice it is found that in prior forms of apparatus the line of cleavage made by the supporting arms is not wholly eradicated until just prior to the time the finished tube emerges from the die-box. In other words the tube is not really fully worked and masticated into a complete homogeneous mass until very nearly the last stage of its formation in the die. Thus in tubes made by prior apparatus the finished tube wall possesses an inherent weakness because of lack of proper mastication or working of the tube stock prior to its extrusion.

Our improved apparatus includes a die-box having a relatively large mouth through which the tube stock is passed just after being severed by the supporting arms of the mandrel. At a point somewhat remote from the enlarged mouth, the die-box is formed with a restricted throat and between the throat and the mouth we provide an enlarged cavity which serves to accommodate a greater amount of tube stock than that which can be accommodated in the die boxes heretofore used. Because of the enlarged cavity or bulbous pocket formed in our die box, the tube stock upon being extruded past the supporting arms of the central mandrel accumulates and is thoroughly masticated and worked over before being forced through the restricted throat to the final forming die.

Heretofore it has also been the practice to form each tube separately from a mass of material extruded by a conveyor screw. In our improved apparatus a single screw or equivalent feeder serves to force tube stock to a plurality or tube forming devices. When such a plurality of devices are employed for making more than one tube from stock coming from the same source it is important that the material be equally divided. Our apparatus includes a parting member which insures an equal distribution of stock material for each tube forming device and also includes means for circulating a fluid through the inner mandrel and an adjacent portion of the die-box so that the temperature at which the tube is formed is held under accurate control.

The invention will be fully apparent from the following specification when read in connection with the accompanying drawings and the novel features will be defined with particularity in the appended claims. In the drawings—

Fig. 1 is a vertical longitudinal section of the delivery end of a tube forming apparatus embodying our invention.

Fig. 2 is a horizontal section on line 2—2 of Fig. 1.

Fig. 3 is a sectional section on line 3—3 of Fig. 2, the center mandrel being shown in elevation.

Fig. 4 is a front view of Fig. 2 part being shown in section on plane indicated by line 4—4 of Fig. 2.

Fig. 5 is a sectional section on line 5—5 of Fig. 2.

Figs. 6 to 11 inclusive are vertical sections on the correspondingly numbered lines of Fig. 3.

Referring in detail to the drawings, 10 represents the casing of a pug-mill having a screw feeder 12 rotatable therein which is adapted to feed a mass of rubber or other gum-like tube stock to the cavities 16—16 in a die-box 18. The die-box illustrated is provided with two cavities but if desired we may use a greater number of cavities so as to simultaneously form a plurality of tubes. When forming a plurality of tubes from stock fed forward by a single feeder such as indicated at 12 it is important that there be an even distribution of the tube stock. For this reason we provide a fitting 20 which is provided with a pointed or tapered parting member 22. The interior of the member 20 is chambered as clearly shown in Figs. 2 and 3 the entrance part 24 of the chamber being relatively high and wide as clearly shown in the Figs. 2 and 3. The exit portion of the chamber tapers downwardly as at 26 and the parting member 22 in effect forms two separate chambers 28—28 through which equal masses of tube stock are delivered to the chambers 16—16 of the die-box.

The die-box 18 is preferably connected to the fitting 20 by means of a quick detachable joint. This joint in the embodiment illustrated includes top and bottom wedge keys 30—30 which ride in ways 32—32 formed in the fitting 20, said keys being adapted to press against shoulders 34—34 provided on the die-box. Beveled seat portions are formed respectively on the fitting 20 and die-box 18 as indicated at 36 in Fig. 3. Thus it is clear that when the keys 30—30 are driven home a neat fit is made between die-box and the fitting 20. When it is desired to clean or inspect the interior of either die-box 18 or the fitting 20 the parts can be easily and quickly dismantled by driving out the keys 30 and then pulling die-box from the end of the fitting.

Extending longitudinally through each chamber 16 we provide a core or mandrel 38 which is supported by three spider arms 40 extending inwardly from an annular rim 42, which in the assembled position engages a shoulder 44 formed in the die-box. The diameter of the rim 42 is slightly less than the bore 46 at the left end of the die-box. In other words there is clearance between the rim and the bore. The mandrels 38 are adapted to be accurately centered by means of radial adjusting screws 48 threaded in the holes of the die-box as best shown in Fig. 5.

The mandrel 38 is provided with a central conduit 50 which communicates with a similar conduit 52 formed in one of the spider arms so that a hot or cooling fluid may be circulated in contact with the walls of the mandrel, the fluid being supplied by the pipe 54.

The mandrel as shown best in Figs. 3 and 11 is pointed at the tip and the supporting arms converge to practically a single central point, from this point it flares outwardly toward the exit end of the die-box and its maximum diameter is in the zone indicated at 56. This enlarged zone of the mandrel is opposite the restricted throat 58 of the die-box. The right end 60 of the mandrel is preferably detachable this part being provided with a threaded shank 62 engaging suitable screw threads formed in the body of the mandrel as clearly shown in Fig. 2. The mandrel's extremity 60 tapers inwardly from the zone 56 preferably at a gradual rate. Surrounding the right end 60 of the mandrel we provide a die member 64 having a screw threaded portion 66 for engagement with a screw threaded cavity formed in the end of the die-box. Spanner holes 68 are formed in the die so as to permit easy adjustment of the die. The interior of the die is formed with a tapered bore 70 and the wall of this bore is of such an angle that the annular space 72 between it and the outer surface of the part 60 of the mandrel converges. As thus arranged it is clear that by screwing the die 64 either in or out the radial dimension of the annular space 74 may be readily varied. Thus the size or thickness of tube wall can be varied to suit requirements.

At the right end of the die-box a chamber 76 is provided and pipes 80—80 communicating therewith are provided whereby the circulation of suitable heating or cooling fluid can be maintained so as to control the temperature of the mass of tube stock within the cavity 16.

The cavity 16 in the die-box is of peculiar formation as above indicated. The mouth 82 being of a dimension relatively greater than the restricted throat 58 and a portion 84 between the mouth and throat being of a bulbous shape so as to accommodate a greater mass of tube stock than that which can be accommodated in the die-boxes heretofore constructed. The peculiar shape of cavity 16 is designed to permit the accumulation of an overplus of stock within the cavity 16 so that the mass of tube stock which has become separated by radial mandrel supporting arms 40 will be thoroughly worked and masticated within cavity 16 so that as it approaches the throat 58 all trace of lines of cleavage will have disappeared. Hence as the stock is extruded through the throat 58 the tube wall will be a homogeneous well worked and masticated structure. Thus as the tube nears completion by being forced through the converging annular space 72 the material will be thoroughly compressed or kneaded so as to form a tube having a wall devoid of weak spots or zones such as are found in tubes formed by prior apparatus because of the parting of the stock in passing mandrel supporting arms.

The fitting 20 is of peculiar design and formation, it being formed as indicated by the various sectional views Figs. 6 to 11 inclusive so that a single mass of tube stock entering the circular opening of the chamber 24 is gradually divided into two equal masses by the parting member 22. This member as shown in Fig. 3 starts for example at the points 86 and recedes inwardly to the right to the zone indicated at 88. The sectional shape of the different parts of this parting member 22 are indicated in Figs. 7 to 10 inclusive. Because of the peculiar shape of this parting member there is a gradual transition of a single mass of tube stock into two equal masses one of which passes to one cavity 16 of the die-box and the other of which passes to the other similar cavity. By the provision of this novel parting member we are therefore able to simultaneously form a plurality of tubes from a mass of tube stock fed by a single member.

So far as we are aware it has heretofore been the practice to provide a separate feeder for the stock for each tube. Such being the common practice in the art because of the generally recognized difficulty of equally dividing the supply of rubber tube stock from a single source. Our improved apparatus makes it possible to divide a common mass of tube stock into substantially equal parts so as to simultaneously form a plurality of tubes. The cavities in our improved die-box are so formed that even though slight inaccuracies creep in, the material is thoroughly worked or masticated so that a plurality of rubber tubes can be readily and accurately produced.

While we have described quite specifically the detail features of the embodiment of the invention illustrated, it is not to be construed that we are limited thereto since various modifications may be made by those skilled in the art without departing from the invention as defined in the appended claims.

What we claim is:

1. In apparatus for extruding rubber tubes a multi-chambered die box adapted to simultaneously form a plurality of tubes and means common to all chambers of the die box for supplying tube stock thereto, parting means for dividing the tube stock into separate masses and guiding it to the separate chambers of the die box, mandrels having pointed ends near said parting means and oblique spider-arms radiating from said pointed ends.

2. In apparatus for extruding rubber tubes a multi-chambered die box adapted to simultaneously form a plurality of tubes and means common to all chambers of the die box for supplying tube stock thereto and a pointed member between said chambers for equally distributing the tube stock thereto, mandrels and means for adjustably positioning them with relation to said member.

3. In apparatus for extruding rubber tubes a die box, means for feeding tube stock thereto including a fitting carrying a parting member, said fitting being connected to the die box by a quick-detachable key which normally holds the parts in assembled relationship.

4. In combination with a machine having means therein for feeding semi-plastic tube stock, a duplex die box, having a pair of chambers therein, mandrels in said chambers, spiders to which said mandrels are secured, a fitting secured to said machine having a parting member defining a pair of outlet orifices in alignment with said mandrels, means securing said die box to said fitting.

5. In combination with a machine having means therein for feeding semi-plastic tube stock, a duplex die box, having a pair of chambers therein, mandrels in said chambers, spiders to which said mandrels are secured, a fitting secured to said machine having a parting member defining a pair of outlet orifices in alignment with said mandrels, means securing said die box to said fitting and means for centering the mandrels with said orifices.

6. In combination with a machine having means therein for feeding semi-plastic tube stock, a die box having a chamber with a restricted throat and an enlarged cavity adjacent to said throat, a mandrel extending longitudinally of the cavity, a supporting member having spider arms secured to said mandrel said arms extending obliquely and meeting at a point coincident with the axis of said mandrels, the die having a tapered bore and being adjustably secured to said die box, one end of the mandrel being disposed within said tapered bore said end being tapered at an angle different from the angle of the bore so as to form a converging annular recess, and centering means cooperating with said supporting member for accurately positioning said mandrel.

In witness whereof, we have hereunto signed our names.

CUYLER S. McCHESNEY.
HAROLD H. CLARK.